Patented Mar. 28, 1950

2,502,080

UNITED STATES PATENT OFFICE 2,502,080

PETROLEUM RESIN DISPERSION AND THE USE THEREOF

Earl Stanley Fenelon, Jr., and Edward J. Pavilonis, Wilmington, Del., assignors to Hercules Powder Company, Wilmington, Del., a corporation of Delaware No Drawing. Application April 19, 1947, Serial No. 742,742

6 Claims. (Cl. 106—218)

1

This invention relates to a new composition of matter containing a petroleum resin and to a method of its use and a product produced thereby.

For many purposes such as, for example, in the preparation of binders, adhesives, coatings, fillers, plasticizers, paper sizing and the like, it is frequently desirable to use petroleum products, both from the standpoint of the low cost generally obtained by their use and from the standpoint of their various advantageous properties. Rosin paste dispersions are frequently thus employed, and it has heretofore been proposed to use for certain of these purposes materials such as asphalt which are incorporated in very minor amounts in rosin compositions and which when incorporated in larger amounts usually result in decreased stability of dispersions prepared therefrom along with other disadvantages such as difficulty of preparation, etc.

According to this invention, a petroleum resin obtained, for example, by the solvent treatment of petroleum products and characterized by being substantially free from asphaltenes and paraffins is incorporated into a rosin dispersion in substantial quantities up to as much as one-half to two-thirds of the total solids content of the dispersion and the resulting petroleum resin-rosin composition is utilized for various purposes such as those heretofore mentioned. The dispersion produced in this manner is characterized by having a high degree of stability upon prolonged storage and may be prepared by means of the conventional techniques and equipment generally employed in the preparation and manufacture of rosin paste dispersions.

Having now indicated in a general way the nature and purpose of the invention, there follows a more detailed description of certain embodiments thereof, the specific examples of which are to be taken in illustration of the invention but not in limitation thereof.

EXAMPLE I

A petroleum resin supplied by the Socony-Vacuum Oil Company under the name "Asphalt Compounding Material (Type C Soft Resin)" and having a Saybolt furol viscosity at 140° F. of a minimum of 250 and a maximum of 400, a specific gravity (60/60° F.) of 1.04 and a flash point (C. O. C.° F.) of 425 and a solubility in carbon tetrachloride of 99.5% was used to provide a petroleum resin-rosin composition according to the following procedure: 570 parts of an FF wood rosin and 380 parts of the petroleum resin were melted and mixed together. An aqueous alkali solution was separately prepared by dissolving 47.6 parts of sodium carbonate in 212.4 parts of water and this aqueous solution was added to the molten petroleum resin-rosin mixture. This mixture was then mildly heated until the saponification reaction was complete and the product was cooled to substantially room temperature to yield a stable, partially saponified petroleum resin-rosin dispersion having a total solids content of 80.1% in which 25.0% of the total solids was unreacted or free rosin and about 38% was the petroleum resin. The dispersion was homogeneous, free from discernible particles of resin or rosin, fluid, stable during hot or cold storage, and either a true solution or a dispersion containing no particles larger than 0.1 micron.

The composition thus prepared was diluted to approximately 10% solids and was added to a beater containing a bleached sulfite pulp in an amount equivalent to about 3% of the weight of the pulp, both the pulp and the composition being calculated on a solids basis. Sufficient alum was added to bring the mixture to pH 4.5 and the stock was then diluted and sheeted in the usual manner. The paper had a resistance to ink of 252 sec. as measured by the News Ink Test. A similar paper sized with 3% of an ordinary rosin size had an ink resistance of 81 sec.

EXAMPLE II

Ten parts of an FF wood rosin having an acid number of 154 was mixed with 10 parts of the petroleum resin described in Example I and the resulting mixture was melted. To this molten mixture was added an aqueous alkali solution containing 0.8 parts of sodium carbonate and 3.12 parts of water. The mixture was maintained at a temperature of about 80 to 95° C. until the saponification and dispersion were substantially complete. This composition was a highly stable petroleum resin-rosin dispersion having a solids content of about 80% and having one-half of the total solids as the petroleum resin and about 25% as free rosin.

This composition was diluted to approximately 10% solids and added to a beater containing a soda pulp in an amount equivalent to 2% of the dry fiber. Sufficient alum was added to bring the mixture to 4.5 and the stock was then diluted and sheeted in the usual manner. The paper had a resistance to ink of 415 sec. as measured by the News Ink Test. Similar paper sized with 2.0% of an ordinary dark rosin size had an ink resistance of 280 sec.

EXAMPLE III

Twenty parts of a wood rosin was melted, saponified and dispersed by the addition thereto of 1.2 parts of sodium hydroxide in 6.5 parts of water. This composition was maintained at 90° C. until the saponification was substantially complete and then 10 parts of the molten petroleum resin described in Example I was added thereto with agitation. The resulting product was a highly stable petroleum resin-rosin dispersion.

This composition was diluted to approximately 10% solids and added to a beater containing an unbleached kraft pulp in an amount equivalent to 1.0% of the dry fiber. Sufficient alum was then added to bring the mixture to pH 4.5 and the stock diluted and sheeted in the usual manner. The paper had an ink resistance of 430 sec. as measured by the News Ink Test, whereas similar paper sized with 1.0% of dark wood rosin size had an ink resistance of 320 sec.

EXAMPLE IV

The composition according to Example III was utilized in a sizing operation according to the following procedure: the sizing composition was continuously diluted in a two-stage process, the preliminary dilution containing 13.4% solids and the secondary solution containing 3.1% solids; the concentrated dispersion was maintained at a temperature of 180° F., diluted in a preliminary stage with hot water at a temperature of 140° F. and diluted in the secondary stage with cold water at a temperature of 50° F. The diluted composition was utilized for sizing a one-half inch insulating board having a weight of 16-17 lbs. per cubic foot and containing 45% groundwood, 45% mixed tailings of news and groundwood, 8% steamed sawdust and 2% groundwood and sulfite lap. The insulating board was formed on an Oliver continuous filter and dried in tunnel dryers to 1-10% moisture. Prior to the addition of the sizing composition, the pH of the furnish was adjusted from 4.7 to 5.0 with sodium aluminate to reach a pH of 6.0 to 6.5. The sizing dispersion was then added and alum subsequently added to bring the pH from 4.3 to 4.5. The sizing composition was added in the amount of 1.52% based on the dry weight of the finished product and the sizing efficiency was determined by the U. S. Government Standard 2-hour water absorption test in which a 6" x 6" sample is immersed in water at 70° F. for two hours and the gain in weight is calculated to percentage absorption.

The sizing results are shown in Table 1 in comparison with the results of a sizing procedure carried out under the same conditions using a 1% mill-made size without pH adjustment with sodium aluminate and a procedure using 1.73% mill-made size and the pH adjustment with sodium aluminate, the sizing test being applied in each case on two samples of the sized product dried to different ranges of moisture content.

*Table 1*

| | #1 Dryer Kiln | | #2 Dryer Kiln | |
|---|---|---|---|---|
| | Moisture, Per Cent in Board | Absorption, Per Cent (wgt.) | Moisture, Per Cent in Board | Absorption, Per Cent (wgt.) |
| 1.52% Composition of Example III | 1.06 | 26.6 | 4.55 | 41.4 |
| 1% Mill-made | 1.53 | 69 | 5.51 | 133.8 |
| 1.73% Mill-made | 1.11 | 37.5 | 8.63 | 55.9 |

In selecting the rosin component for the composition according to this invention, there may be used any grade of wood or gum rosin as desired, for example, a conventional FF rosin or any of the pale grades of rosin. There may also be used rosin containing at least a portion of the various darker grades of rosin and also rosin by-products such as, for example, partially or substantially gasoline-insoluble resinous material obtained as a by-product in the manufacture of pale grades of wood rosin, as well as rosin containing at least a portion of polymerized rosin, hydrogenated rosin, and the like.

The petroleum resin used in this composition is a light-colored resinous material separated by solvent treatment of petroleum products; "Industrial and Engineering Chemistry," pages 294-298, March 1940, describes methods of obtaining resins of this type from petroleum residues. For example, a petroleum distillation residue may be treated by the addition of a solvent such as propane whereby the asphaltenes and the like are separated out, and upon further addition of propane a resin of the type contemplated by this invention will separate. These resins generally have characteristics between the paraffins and asphaltenes in such properties as solubilities, color, and the like. They are generally semisolid and balsamlike at room temperature and fluid slightly above room temperature and have boiling or distillation points in the range of the usual petroleum lubricating oil or distillation residue components. They are substantially chemically neutral, i. e., nonacidic, and are readily compatible with rosin. A particular resin which has proved highly satisfactory for the composition and process described herein is sold by the Socony-Vacuum Oil Company under the name "Asphalt Compounding Material (Type C Soft Resin)" and other similar resins of this class and type are also highly satisfactory, e. g., a product supplied under the name "Kendex 0860" by Kendall Refining Company and having a specific gravity (26.7/20) of 0.9867, a flash point (C. O. C.° F.) 463, a solubility in petroleum ether 99.9%, a color (Lovibond equivalents) 30 yellow, 1 red, and an acid number of nil; "Dutrex B" by Shell Oil Company, having a specific gravity of 1.0085, a flash point of 493° F., solubility in petroleum ether of 99.6, a color of 50 yellow and 7 red, and an acid number of nil; "Asphalt Compounding Material (Petroleum Resin Type A Soft)" by Socony-Vacuum Oil Company having a specific gravity of 0.9535, a flash point of 422° F., a solubility in petroleum ether of 98.5%, a color of 50 yellow and 5.5 red, and an acid number of nil, and "Depropanized Resin 44-EL-298" by Esso Laboratories Standard Oil Company of Louisiana having a specific gravity of 0.9136, a flash point of 533° C., a solubility in petroleum ether of 98.5%, a color of 8 yellow and 2 red, an acid number of 1.2, and a viscosity (S. F. at 140° F.) of 116.

The petroleum resin is highly compatible with rosin both when melted and mixed and when dispersed in the manner conventionally used with rosin. Up to as much as one-half to two-thirds of the total solids of a high total solids aqueous dispersion of rosin, saponified rosin and this petroleum resin may consist of the petroleum resin constituent, and the resulting dispersion is stable. The inclusion of the petroleum resin does not alter the stability characteristics of a rosin paste dispersion; the petroleum resin-rosin dispersion may be prepared, stored, transported, and used with the same techniques and equipment conventionally employed with rosin paste dispersions.

A mixed dispersion of rosin, saponified rosin and the petroleum resin is characterized by being substantially free from discernible particles, i. e., particles over about 0.1 micron when examined microscopically. In this respect the dispersions differ surprisingly from comparable paraffin and asphalt dispersions, both of which have large, observable particles considerably larger than 0.1 micron in size; the presence or absence of observable particles in a freshly prepared composition is a rough indication of storage stability, and the petroleum resin-containing composition is characterized by being stable whereas compositions containing substantial quantities of paraffins and asphalt in general are not stable.

For the dispersion of the resin and rosin composition, there may be used various alkalies such as sodium carbonate, sodium hydroxide, or like agents including the other alkali salts such as potassium, ammonium, and the like. Likewise, there may be used dispersing agents such as rosin soaps prepared separately and added to the composition.

It will be understood, of course, that the order of mixing the components of the new composition may be varied without departing from the invention. For example, the petroleum resin and the rosin may first be mixed and then dispersed, or, if desired, alkali may first be added to the rosin and the petroleum resin added later. Other variations in the order of compounding the ingredients will be obvious to those skilled in the art.

The proportions of constituents in the dispersion according to this invention may be varied within relatively wide limits. For example, the amount of the petroleum resin in the composition may be varied from almost a negligible quantity up to as much as one-half the total solids without requiring unusual care in compounding the dispersion and may be included in an amount up to as much as two-thirds of the total solids under optimum conditions, and the total solids of the composition may range as high as about 85% as contrasted with the solids content of about 70 to 75% generally considered a maximum with ordinary rosin paste compositions, the general range of proportions being up to 85% total solids, of which up to two-thirds is petroleum resin, 10 to 40% is free rosin and at least about 10% saponified rosin. The amount of the petroleum resin in the composition depends, of course, on the particular type of petroleum resin which is used and also on the type of rosin and the proportion of free and saponified rosin, percentage of total solids and the like. For example, when the composition contains about 75 to 80% solids and 20% petroleum resin based on the amount of total solids, it is preferred to have at least about 10% and not over about 40% free rosin (also based on total solids) in the composition, preferably between about 20 and 35% free rosin, the remainder being saponified rosin in the amount of at least about 10%, and optionally other constituents. When there is prepared a paste containing about 80% free solids of which about 50% is the petroleum resin, it is preferred to adjust the proportions so that about 20 to 35% and preferably about 20 to 30% of the total solids is free rosin. The total solids content of the dispersion may range from a low concentration up to a total solids content of as high as 85%; in order to obtain the maximum economy in transportation and freight charges while retaining optimum viscosity characteristics, it is preferable to prepare a composition containing between about 50% and about 80% total solids, usually around 75 to 80%, and subsequently dilute the composition if a less concentrated dispersion is desired.

The proportions of the composition may be varied widely within the above-indicated limits and full benefit will be realized from the advantageous characteristics of the composition such as its small particle size, stability, economy, and the like. However, for certain purposes, it will be possible to depart from the preferred limits to obtain a product possessing some but not all of the advantages; for example, there may be prepared a composition containing about 80% total solids of which about 50% is petroleum resin and of which 10% or even less is free rosin. This composition is characterized by forming a cloudy dispersion upon dilution in water and by having observable particles of a size greater than 0.1 micron; however, this composition when prepared and used without a storage period is satisfactory for the sizing of paper and the like.

The composition prepared according to this invention is a highly efficient paper sizing dispersion which produces sizing results on papers generally comparable with or superior to the sizing results obtained by the use of the conventional rosin dispersions. When a soda or sulfite pulp is sized, for example as shown in Example IV, there is produced a sized paper having sizing characteristics measurably superior to the characteristics obtained by the use of a conventional rosin size. Likewise, in the other uses of the composition such as, for example, adhesives, binders, fillers, general coatings and the like, the results obtained by the present composition are generally comparable with or superior to the results obtained by other rosin-containing dispersions.

What we claim and desire to protect by Letters Patent is:

1. A composition consisting essentially of an aqueous dispersion of rosin, an alkali rosinate, and a petroleum resin and containing up to about 85% total solids of which solids up to about two-thirds is petroleum resin, from about 10 to about 40% is free rosin and at least about 10% is said petroleum resin being the resin derived by solvent treatment of petroleum distillation residues through the addition of a lower hydrocarbon solvent in an amount to precipitate therefrom the asphalt content thereof and subsequent addition to the substantially asphalt-free fraction of a further quantity of the lower hydrocarbon solvent to precipitate the desired petroleum resin therefrom.

2. A composition consisting essentially of an aqueous dispersion of rosin, an alkali rosinate, and a petroleum resin and containing up to about 85% total solids of which solids up to about one-half is petroleum resin and from about 10 to about 40% is free rosin, said petroleum resin being an alkali rosinate the resin derived by solvent treatment of petroleum distillation residues through the addition of a lower hydrocarbon solvent in an amount to precipitate therefrom the asphalt content thereof and subsequent addition to the substantially asphalt-free fraction of a further quantity of the lower hydrocarbon solvent to precipitate the desired petroleum resin therefrom.

3. A composition consisting essentially of an aqueous dispersion of rosin, an alkali rosinate, and a petroleum resin and containing up to about 85% total solids of which solids up to about two-thirds is petroleum resin and from about 20 to about 35% is free rosin, said petroleum resin being the resin derived by solvent treatment of petroleum distillation residues through the addition of a lower hydrocarbon solvent in an amount to precipitate therefrom the asphalt content thereof and subsequent addition to the substantially asphalt-free fraction of a further quantity of the lower hydrocarbon solvent to precipitate the desired petroleum resin therefrom.

4. A composition consisting essentially of an aqueous dispersion of rosin, an alkali rosinate, and a petroleum resin and containing up to about 85% total solids of which solids up to about one-half is petroleum resin and from about 20 to about 35% is free rosin, said petroleum resin being the resin derived by solvent treatment of petroleum distillation residues through the addition of a lower hydrocarbon solvent in an amount to precipitate therefrom the asphalt content thereof and subsequent addition to the substantially asphalt-free fraction of a further quantity of the lower hydrocarbon solvent to precipitate the desired petroleum resin therefrom.

5. A composition consisting essentially of an aqueous dispersion of rosin, an alkali rosinate, and a petroleum resin and containing about 70 to 80% total solids of which total solids about one-third is the petroleum resin and about 25 to about 30% is free rosin, said petroleum resin being the resin derived by solvent treatment of petroleum distillation residues through the addition of a lower hydrocarbon solvent in an amount to precipitate therefrom the asphalt content thereof and subsequent addition to the substantially asphalt-free fraction of a further quantity of the lower hydrocarbon solvent to precipitate the desired petroleum resin therefrom.

6. A composition consisting essentially of an aqueous dispersion of rosin, an alkali rosinate, and a petroleum resin and containing up to about 85% total solids of which solids up to about two-thirds is petroleum resin, from about 10 to about 40% is free rosin and at least about 10% is an alkali rosinate, said petroleum resin being the resin prepared by solvent separation from a petroleum distillation residue and having a Saybolt furol viscosity at 140° F. of a minimum of 250 and a maximum of 400, a specific gravity (60/60° F.) of 1.04 and a flash point (C. O. C.° F.) of 425 and a solubility in carbon tetrachloride of 99.5%.

EARL STANLEY FENELON, Jr.
EDWARD J. PAVILONIS.

REFERENCES CITED

The following references are of record in the file of this patent:

UNITED STATES PATENTS

| Number | Name | Date |
|---|---|---|
| 1,882,680 | Wieger | Oct. 8, 1932 |
| 1,948,442 | Ellis | Feb. 20, 1934 |
| 2,055,799 | Outterson | Sept. 29, 1936 |
| 2,286,244 | Whitacre | June 16, 1942 |
| 2,337,337 | McCluer et al. | Dec. 21, 1943 |

Certificate of Correction

Patent No. 2,502,080                                                                                            March 28, 1950

EARL STANLEY FENELON, Jr., ET AL.

It is hereby certified that errors appear in the printed specification of the above numbered patent requiring correction as follows:

Column 6, line 46, after "is" and before "said" insert the words and comma *an alkali rosinate,*; line 61, strike out "an alkali rosinate";

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*